United States Patent
Sethi et al.

(10) Patent No.: US 11,233,625 B1
(45) Date of Patent: Jan. 25, 2022

(54) POWER-BOOSTED PILOT TONES IN OFDM COMMUNICATION

(71) Applicant: NXP USA, Inc., Austin, TX (US)

(72) Inventors: Ankit Sethi, Pune (IN); Sudhir Srinivasa, Los Gatos, CA (US); Sayak Roy, Kolkata (IN)

(73) Assignee: NXP USA, Inc., Austin, TX (US)

( * ) Notice: Subject to any disclaimer, the term of this patent is extended or adjusted under 35 U.S.C. 154(b) by 44 days.

(21) Appl. No.: 16/591,645

(22) Filed: Oct. 3, 2019

Related U.S. Application Data (60) Provisional application No. 62/745,870, filed on Oct. 15, 2018.

(51) Int. Cl.
*H04L 5/00* (2006.01)
*H04W 52/32* (2009.01)
*H04W 80/02* (2009.01)
*H04L 27/26* (2006.01)

(52) U.S. Cl.
CPC .......... *H04L 5/0092* (2013.01); *H04L 5/0007* (2013.01); *H04L 5/0048* (2013.01); *H04L 5/0053* (2013.01); *H04L 27/2613* (2013.01); *H04W 52/325* (2013.01); *H04W 80/02* (2013.01)

(58) Field of Classification Search
None
See application file for complete search history.

(56) References Cited

U.S. PATENT DOCUMENTS

| | | | | |
|---|---|---|---|---|
| 2004/0127245 A1* | 7/2004 | Sadri | ............ | H04L 27/2601 455/522 |
| 2007/0230388 A1* | 10/2007 | Li | ............ | H04L 27/2637 370/313 |
| 2007/0254601 A1* | 11/2007 | Li | ............ | H04B 7/0413 455/88 |
| 2008/0123592 A1* | 5/2008 | Popovic | ............ | H04L 25/0226 370/330 |
| 2009/0060075 A1* | 3/2009 | Mohebbi | ............ | H04L 27/2613 375/260 |

(Continued)

OTHER PUBLICATIONS

P802.11ax/D3.3 draft standard, "Draft Standard for Information technology; Telecommunications and Information exchange between systems Local and metropolitan area networks; Specific requirements; Part 11: Wireless LAN Medium Access Control (MAC) and Physical Layer (PHY) Specifications; Amendment 1: Enhancements for High Efficiency WLAN", Section 28.3 (pp. 1-4, 423-670), Dec. 2018.

*Primary Examiner* — Brandon M Renner (57) ABSTRACT

A method for signal transmission includes generating a sequence of modulated symbols, each modulated symbol including multiple sub-carriers having respective sub-carrier frequencies, by (i) designating a first subset of the sub-carriers to serve as non-pilot sub-carriers, and designating a second subset of the sub-carriers to serve as pilot sub-carriers, (ii) modulating non-pilot information onto the non-pilot sub-carriers, and modulating pilot information onto the pilot sub-carriers, and (iii) in at least some of the symbols, setting the non-pilot sub-carriers to a first power level, and setting one or more of the pilot sub-carriers to a second power level that is higher than the first power level. The sequence of the modulated symbols is transmitted over a communication channel to a receiver.

22 Claims, 4 Drawing Sheets

(56) References Cited

U.S. PATENT DOCUMENTS

| | | | |
|---|---|---|---|
| 2009/0067519 A1* | 3/2009 | Baggen | H04N 13/305 375/260 |
| 2009/0285316 A1* | 11/2009 | Park | H04L 25/0202 375/260 |
| 2014/0286459 A1* | 9/2014 | Eliaz | H04L 27/3818 375/340 |
| 2017/0142665 A1* | 5/2017 | Tabet | H04W 72/048 |
| 2017/0201359 A1* | 7/2017 | Li | H04W 72/0453 |
| 2017/0265129 A1* | 9/2017 | Chen | H04L 5/0048 |
| 2018/0183489 A1* | 6/2018 | Rasmussen | H04B 1/7101 |
| 2018/0248592 A1* | 8/2018 | Ashrafi | H04L 5/0048 |
| 2019/0007903 A1* | 1/2019 | Keragodu Surya Prakash | H04W 8/005 |
| 2019/0320403 A1* | 10/2019 | Zhang | H04W 64/003 |

\* cited by examiner

POWER-BOOSTED PILOT TONES IN OFDM COMMUNICATION

CROSS-REFERENCE TO RELATED APPLICATIONS

This application claims the benefit of U.S. Provisional Patent Application 62/745,870, filed Oct. 15, 2018, whose disclosure is incorporated herein by reference.

FIELD OF THE DISCLOSURE

The present disclosure relates generally to digital communication, and particularly to methods and systems for transmission and reception of signals comprising pilot tones.

BACKGROUND

Various communication standards specify the use of pilot signals, e.g., for assisting a receiver in synchronizing to the timing, phase and/or frequency of a received signal. For example, the IEEE 802.11 family of standards specifies allocation of selected sub-carriers in an Orthogonal Frequency Division Multiplexing (OFDM) signal to serve as pilot sub-carriers in Wireless Local-Area Network (WLAN) transmissions.

For example, pilot tones in IEEE 802.11ax networks are specified in section 28.3 of IEEE P802.11ax™/D3.3 draft standard, entitled "Draft Standard for Information technology; Telecommunications and information exchange between systems Local and metropolitan area networks; Specific requirements; Part 11: Wireless LAN Medium Access Control (MAC) and Physical Layer (PHY) Specifications; Amendment 1: Enhancements for High Efficiency WLAN," December, 2018, which is incorporated herein by reference. Sections 28.3.11.13 of this draft standard specifies power level requirements for pilot and data sub-carriers.

The description above is presented as a general overview of related art in this field and should not be construed as an admission that any of the information it contains constitutes prior art against the present patent application.

SUMMARY

An embodiment that is described herein provides a method for signal transmission. The method includes generating a sequence of modulated symbols, each modulated symbol including multiple sub-carriers having respective sub-carrier frequencies, by (i) designating a first subset of the sub-carriers to serve as non-pilot sub-carriers, and designating a second subset of the sub-carriers to serve as pilot sub-carriers, (ii) modulating non-pilot information onto the non-pilot sub-carriers, and modulating pilot information onto the pilot sub-carriers, and (iii) in at least some of the symbols, setting the non-pilot sub-carriers to a first power level, and setting one or more of the pilot sub-carriers to a second power level that is higher than the first power level. The sequence of the modulated symbols is transmitted over a communication channel to a receiver.

In an embodiment, generating the modulated symbols includes generating Orthogonal Frequency Division Multiplexing (OFDM) symbols. In another embodiment, generating the sequence includes generating a communication packet including at least a training-field symbol followed by data symbols, and setting the second power level includes setting the pilot symbols in the training-field symbol and in the following data symbols to a same second power level.

In yet another embodiment, generating the sequence includes generating a communication packet, and the method further includes (i) setting the second power level, applied to the pilot sub-carriers, to be higher than the first power level in a first portion of the communication packet, and (ii) in a second portion of the communication packet, setting the second power level to be equal to the first power level. In a disclosed embodiment, the receiver is associated with a vendor identifier, and the method includes deciding whether or not to set the second power level to be higher than the first power level, depending on the vendor identifier of the receiver.

In some embodiments, the method includes setting the second power level to be higher than the first power level in only a partial subset of the pilot sub-carriers that is less than all the sub-carriers. In an example embodiment, the method includes retaining one or more pilot sub-carriers, which are not in the partial subset, at the first power level. In another example embodiment, the method includes selecting the partial subset of the pilot sub-carriers, in which the second power level is to be higher than the first power level, depending on received-signal quality on the respective sub-carrier frequencies.

In some embodiments, generating the modulated symbols is performed in a physical-layer (PHY) process, and the method includes receiving in the PHY process, from a Medium Access Control (MAC) process, one or more parameters for configuring the pilot sub-carriers, and setting the one or more of the pilot sub-carriers to the second power level based on the one or more parameters. In an embodiment, the one or more parameters include an indication of a portion of the communication packet in which the one or more of the pilot sub-carriers are to be set to the second power level. In an embodiment, the one or more parameters include an indication of a frequency sub-band in which the one or more of the pilot sub-carriers are to be set to the second power level. In an embodiment, the one or more parameters include a vendor identifier that the receiver is associated with.

There is additionally provided, in accordance with an embodiment that is described herein, a method for signal reception. The method includes receiving a sequence of modulated symbols, each modulated symbol including multiple sub-carriers having respective sub-carrier frequencies, wherein a first subset of the sub-carriers is designated to serve as non-pilot sub-carriers, and a second subset of the sub-carriers is designated to serve as pilot sub-carriers. A checking is made whether, in at least some of the symbols, one or more of the pilot sub-carriers have a higher power level than the non-pilot sub-carriers. First processing is applied to the received symbols when one or more of the pilot sub-carriers do not have a higher power level than the non-pilot sub-carriers, and second processing, different from the first processing, is applied to the received symbols when one or more of the pilot sub-carriers have a higher power level than the non-pilot sub-carriers.

In an embodiment, checking whether one or more of the pilot sub-carriers have a higher power level than the non-pilot sub-carriers includes calculating a ratio between an average power level of the one or more of the pilot sub-carriers and an average power level of the non-pilot sub-carriers, and comparing the ratio to a predefined power-difference threshold. In an embodiment, applying the first processing includes applying frequency-domain smoothing to the received symbols based on both the non-pilot sub-carriers and the one or more of the pilot sub-carriers, and applying the second processing includes applying the frequency-domain smoothing based on the non-pilot sub-carriers, but not based on the one or more of the pilot sub-carriers.

There is also provided, in accordance with an embodiment that is described herein, a transmitter including a baseband processor and Radio Frequency (RF) circuitry. The baseband processor is configured to generate a sequence of modulated symbols, each modulated symbol including multiple sub-carriers having respective sub-carrier frequencies, by (i) designating a first subset of the sub-carriers that is less than all of the sub-carriers to serve as non-pilot sub-carriers, and designating a second subset of the sub-carriers that is different from the first set of sub-carriers to serve as pilot sub-carriers, (ii) modulating non-pilot information onto the non-pilot sub-carriers, and modulating pilot information onto the pilot sub-carriers, and (iii) in at least some of the symbols, setting the non-pilot sub-carriers to a first power level, and setting one or more of the pilot sub-carriers to a second power level that is higher than the first power level. The RF circuitry is configured to transmit the sequence of the modulated symbols over a communication channel to a receiver.

There is further provided, in accordance with an embodiment that is described herein, a receiver including Radio Frequency (RF) circuitry and a baseband processor. The RF circuitry is configured to receive a signal including a sequence of modulated symbols, each modulated symbol including multiple sub-carriers having respective sub-carrier frequencies, wherein a first subset of the sub-carriers is designated to serve as non-pilot sub-carriers, and a second subset of the sub-carriers is designated to serve as pilot sub-carriers. The a baseband processor configured to check whether, in at least some of the symbols, one or more of the pilot sub-carriers have a higher power level than the non-pilot sub-carriers, to apply first processing to the received symbols when one or more of the pilot sub-carriers do not have a higher power level than the non-pilot sub-carriers, and to apply second processing to the received symbols when one or more of the pilot sub-carriers have a higher power level than the non-pilot sub-carriers.

The present disclosure will be more fully understood from the following detailed description of the embodiments thereof, taken together with the drawings in which:

DETAILED DESCRIPTION OF EMBODIMENTS

In a typical Orthogonal Frequency Division Multiplexing (OFDM) system, a transmitter transmits to a receiver a sequence of symbols, each symbol comprising a plurality of modulated sub-carriers having respective sub-carrier frequencies. The transmitter typically designates selected sub-carriers for transmitting pilot signals.

In the present context, the term "pilot signal" means a signal that is known to the receiver a-priori. By comparing (e.g., correlating) received pilot signals with the corresponding known signals, the receiver is able to estimate and correct parameters such as timing offset, frequency offset and/or phase offset between the transmitter and the receiver.

Sub-carriers that carry pilot signals are referred to herein as "pilot sub-carriers." The other sub-carriers in the OFDM symbol are referred to herein as "non-pilot sub-carriers." Non-pilot sub-carriers may carry any suitable information, such as user data, signaling data, training fields used for channel estimation, and the like.

The IEEE 802.11 standards (including but not limited to 802.11a, 802.11b, 802.11g, 802.11n, 802.11ac, 802.11ax and 802.11p) specify how pilot sub-carriers are to be transmitted as part of OFDM symbols. Among other specifications, the IEEE 802.11 standards require that all the sub-carriers in an OFDM symbol, including both pilot and non-pilot sub-carriers, have the same average power.

In some practical scenarios, however, transmitting pilot sub-carriers and non-pilot sub-carriers with the same power level degrades the receiver performance. For example, in poor Signal-to-Noise Ratio (SNR) conditions, synchronizing the receiver using noisy pilot sub-carriers may lead to large residual timing, frequency and/or phase offsets between the transmitter and the receiver. Such residual offsets may in turn lead to increased packet errors and thus reduced communication range and reduced throughput.

The adverse effect of noisy pilot sub-carriers is particularly severe when using high-order high-density constellations, such as 256-QAM or 1024-QAM, which are highly sensitive to noise. Another sensitive scenario occurs when an OFDM symbol comprises only a small number of pilot sub-carriers. Yet another example is high-mobility scenarios that are characterized by large Doppler spread.

Embodiments that are descried herein provide improved techniques for transmission and reception of OFDM signals. Although the embodiments described herein refer mainly to WLAN communication in accordance with the IEEE 802.11 standards, the disclosed techniques are applicable in various other suitable communication schemes having multiple sub-carriers. Sub-carriers are also sometimes referred to as tones, and the two terms are used interchangeably herein.

In some disclosed embodiments, a transmitter in a WLAN device (an access point—AP, or a client station—STA) generates a sequence of modulated symbols, and transmits the sequence to a receiver in a remote WLAN device (an STA or an AP). Each modulated symbol comprises multiple sub-carriers having respective sub-carrier frequencies. A first subset of the sub-carriers is designated to serve as non-pilot sub-carriers, and a second subset of the sub-carriers is designated to serve as pilot sub-carriers.

The transmitter generates the symbols by modulating non-pilot information onto the non-pilot sub-carriers, and modulating pilot information onto the pilot sub-carriers. In at least some of the symbols, the transmitter sets the non-pilot sub-carriers to a first power level, and sets one or more of the pilot sub-carriers to a second power level that is higher than the first power level.

In the description that follows, the operation of setting a higher power level to pilot sub-carriers is referred to as "boosting" or "pilot boosting." In some embodiments the transmitter boosts the power level of all the pilot sub-carriers in the symbol. In other embodiments the transmitter boosts the power level of a selected subset of the pilot sub-carriers in the symbol, e.g., sub-carriers that are known or estimated to have poor received-signal quality.

In some embodiments, the transmitter boosts the power level of pilot sub-carriers in all the symbols of a given packet. In other embodiments the transmitter performs pilot boosting only in a selected portion of the packet, e.g., in the symbols of a selected training field and in the symbols that follow it until the next training field.

When using pilot boosting, the receiver that receives the above-described signal is able to synchronize to the transmitter (e.g., in timing, frequency and/or phase) with high accuracy, because the pilot signals are received with a higher SNR. As noted above, this capability is especially important in difficult scenarios such as marginal SNR, high-order constellations, sparse pilot sub-carriers or large Doppler spread. When timing, frequency and/or phase synchronization is improved, data decoding performance improves as well. This improvement leads to increased communication range and/or throughput.

In some embodiments, the receiver receives and decodes signals with power-boosted pilot sub-carriers without necessarily being aware that boosting is being performed. Thus, the disclosed techniques are suitable for use with legacy receivers without a need for any modifications. In other embodiments, the receiver is configured to identify that at least some of the received pilot sub-carriers are boosted in power, and to adapt its processing accordingly. For example, when performing frequency-domain smoothing of the received signal, the receiver may improve the smoothing operation by excluding (e.g., skipping) the power-boosted pilot sub-carriers.

Figure 1:
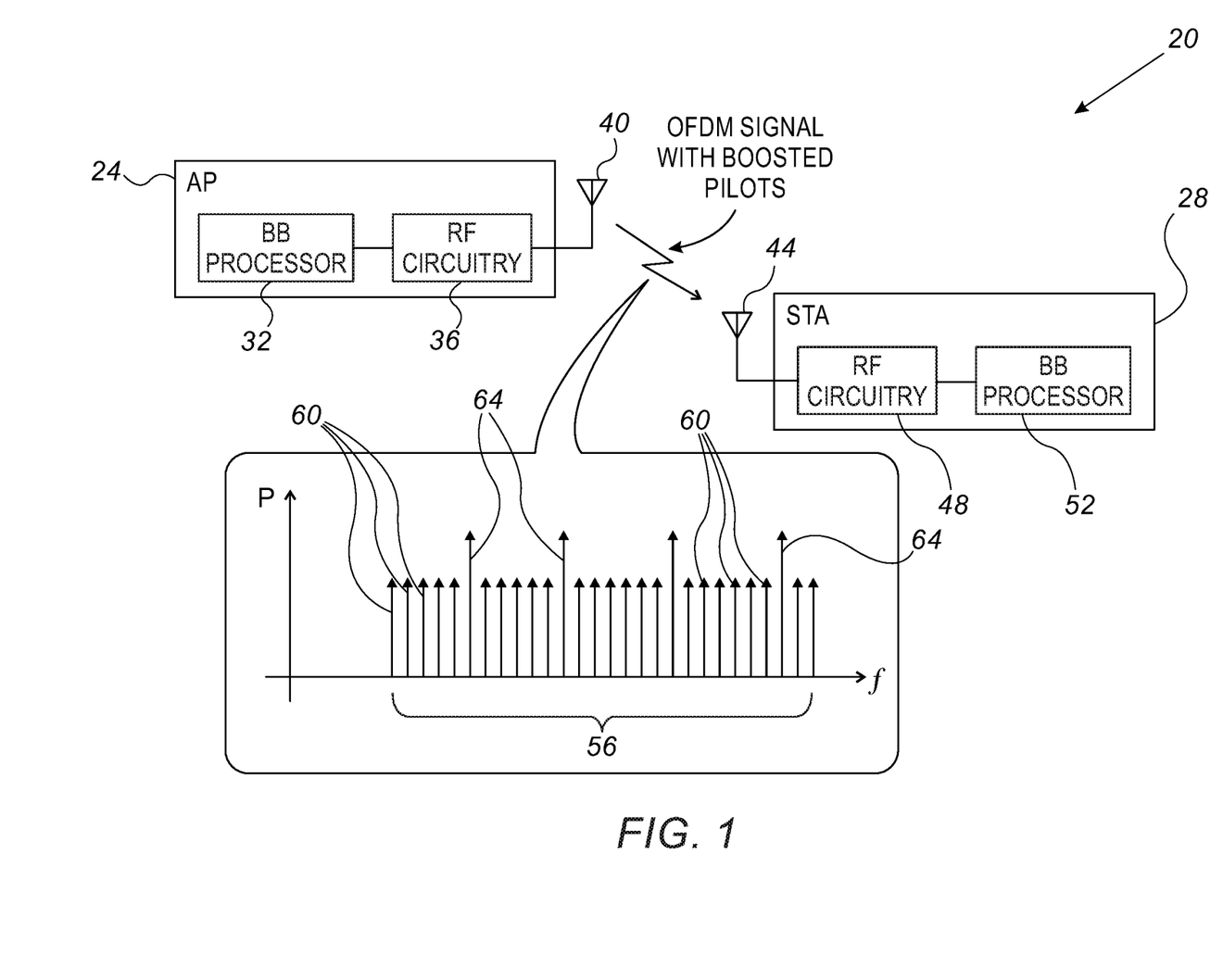
FIG. 1 is a block diagram that schematically illustrates a Wireless Local-Area Network (WLAN) communication system that employs boosting of pilot sub-carriers, in accordance with an embodiment that is described herein.

FIG. 1 is a block diagram that schematically illustrates a WLAN communication system 20 that employs boosting of pilot sub-carriers, in accordance with an embodiment that is described herein. System 20 comprises an Access Point (AP) 24 and a client station (STA) 28. In an embodiment, although not necessarily, AP 24 and STA 28 operate in accordance with a suitable IEEE 802.11 standard, e.g., 802.11a, 802.11b, 802.11g, 802.11n, 802.11ac, 802.11ax or 802.11p. The figure shows a single AP 24 and a single STA 28, for clarity. Real-life systems, however, typically comprise multiple STAs 28 and may comprise multiple APs 24.

In the present example, AP 24 comprises a baseband (BB) processor 32 that performs the various digital baseband functions of the AP, and Radio Frequency (RF) circuitry 36 that performs the various analog and RF functions of the AP. Among other functions, BB processor generates a baseband OFDM signal with power-boosted pilot sub-carriers, as will be described in detail below. RF circuitry 36 up-converts the OFDM signal to RF, and transmits the RF signal via one or more antennas 40 to STA 28.

In the present example, STA 28 comprises one or more antennas 44, RF circuitry 48 that performs the various analog and RF functions of the STA, and a BB processor 52 that performs the various digital baseband functions of the STA. RF circuitry 48 receives the RF OFDM signal transmitted by AP 24 and down-converts the signal to baseband. BB processor 52 decodes the baseband OFDM signal. Among other functions, BB processor 52 synchronizes to the timing, phase and/or frequency of AP 24 with the assistance of the power-boosted pilot sub-carriers. In this manner, BB processor 52 is able to decode user data carried by the OFDM signal with high reliability, high throughput and large communication range.

A graph in an inset at the bottom of FIG. 1 illustrates an example of an OFDM signal 56 that is transmitted by AP 24, in an embodiment. The horizontal axis of the graph denotes frequency (f), and the vertical axis denotes average power (P). OFDM signal 56 comprises non-pilot sub-carriers 60 and pilot sub-carriers 64. As seen, the power levels of pilot sub-carriers 64 are higher than the power levels of non-pilot sub-carriers 60.

The OFDM signal shown in FIG. 1 is an example signal, depicted solely for the sake of conceptual clarity. In alternative embodiments, various other suitable signal configurations can be used.

In various embodiments, BB processor 32 of AP 24 may set the difference in power level (between the pilot sub-carriers and the non-pilot sub-carriers) to any suitable value. Typical values are, for example, 3 dB or 6 dB, but any other suitable values can be used.

The example of FIG. 1, and the embodiments described herein in general, focus mainly on downlink transmissions from AP 24 to STA 28. In these examples, the terms "AP" and "transmitter" are sometimes used interchangeably, and the terms "STA" and "receiver" are sometimes used interchangeably. The disclosed techniques, however, are equally applicable to uplink transmission from STA 28 to AP 24, in which case STA 28 serves as the transmitter and AP 24 serves as the receiver.

In the example signal 56 of FIG. 1, BB processor 32 boosts the power level of all pilot sub-carriers 64. In alternative embodiments, BB processor 32 boosts the power level of only a selected subset of pilot sub-carriers 64 (which is less than all pilot sub-carriers 64). This feature is desirable because, for maintaining a given average power level of the entire OFDM symbol, boosting of pilot sub-carriers decreases the power levels of the non-pilot sub-carriers. Therefore, in some cases it is useful to boost the power level of pilot sub-carriers selectively.

In an example embodiment, BB processor 32 estimates the received signal qualities for the frequencies of the various pilot sub-carriers 64, boosts the power levels of only the pilot sub-carriers 64 whose frequencies are characterized with a received signal quality that is below a quality threshold. Pilot sub-carriers characterized by higher received signal quality are not boosted, and are typically set to the same power level as non-pilot sub-carriers 60. In this manner, BB processor 32 "invests" the average-power resources of the OFDM symbol in the pilot sub-carriers that would benefit most from boosting.

In one embodiment, BB processor 32 estimates the received signal qualities for the frequencies of the various pilot sub-carriers 64 based on downlink Channel State Information (CSI) reported by STA 28. The downlink CSI is directly indicative of the signal quality with which the STA receives the pilot sub-carriers. In an alternative embodiment, BB processor 32 estimates the received signal qualities for the frequencies of the various pilot sub-carriers 64 based on uplink CSI computed locally in AP 24 for the frequencies in question. The uplink CSI is implicitly indicative of the downlink signal quality, under an assumption that the uplink and downlink channel responses are similar.

In further alternative embodiments, BB processor 32 selects the subset of pilot sub-carriers to be boosted based on any other suitable selection criterion.

Figure 2:
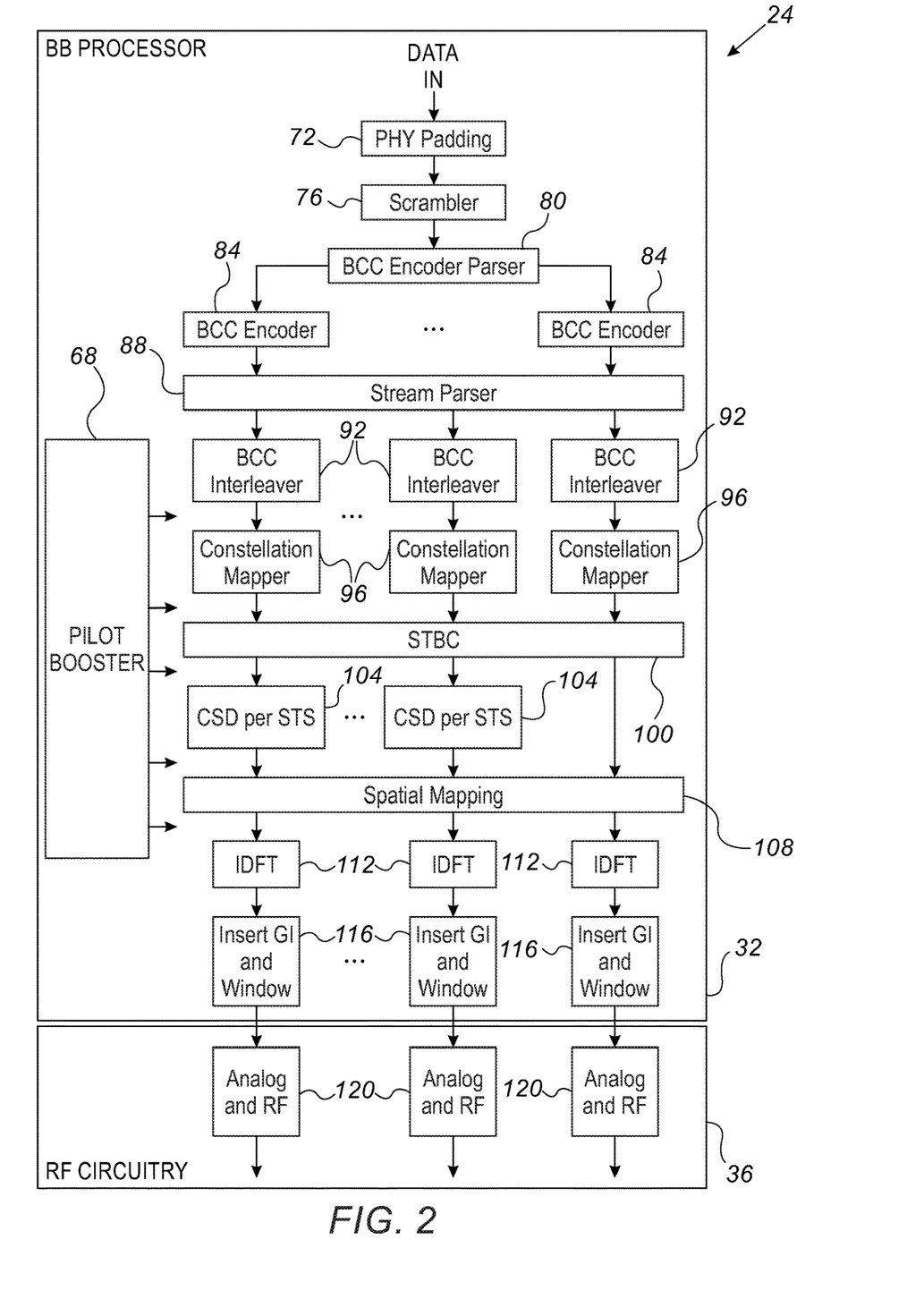
FIG. 2 is a block diagram that schematically illustrates an Access Point (AP) in the system of FIG. 1, which uses boosting of pilot sub-carriers, in accordance with an embodiment that is described herein.

FIG. 2 is a block diagram that schematically illustrates elements of AP 24 of system 20, in accordance with an embodiment that is described herein. The figure focuses on the transmit-side elements of BB processor 32 and RF circuitry 36. Other AP elements, e.g., receive-side elements, have been omitted for the sake of clarity.

In addition to the various stages of the signal transmission chain depicted in the figure, BB processor 32 comprises a pilot booster 68, which is configured to set at least some of the pilot sub-carriers in at least some of the OFDM symbols to a higher power level, relative to the non-pilot symbols.

In the embodiment of FIG. 2, BB processor 32 comprises a cascade of the following elements:

- A physical-layer (PHY) padding module 72 is configured to receive a stream of input data, and to pad the input data in preparation for Binary Convolutional Code (BCC) encoding.
- A scrambler 76 is configured to scramble the padded input data by bit-wise multiplication with a scrambling sequence.
- A parser 80 parses the scrambled data stream into $N_{ES}$ data streams.
- A bank of $N_{ES}$ BCC encoders 84 encode the respective $N_{ES}$ data streams with a suitable BCC.
- A stream parser 88 is configured to parse the $N_{ES}$ encoded data streams into $N_{SS}$ spatial streams.
- A bank of $N_{SS}$ BCC interleavers 92 interleave each of the respective $N_{SS}$ spatial streams.
- A bank of $N_{SS}$ constellation mappers 96 map each of the respective $N_{SS}$ spatial streams onto constellation symbols, i.e., to modulate the data.
- A Space-Time Block Coding (STBC) encoder 100 applies STBC coding among the $N_{SS}$ spatial streams, so as to produce $N_{STS}$ space-time streams.
- One or more Cyclic Shift Diversity (CSD) modules 104 apply a cyclic delay to one or more of the $N_{STS}$ space-time streams.
- A spatial mapping module 108 applies spatial multiplexing, e.g., beamforming, to the $N_{STS}$ space-time streams, so as to produce $N_{TX}$ transmission streams (a transmission stream per AP antenna 40).
- A bank of $N_{TX}$ Inverse Discrete Fourier Transform (IDFT) modules 112 transform the respective $N_{TX}$ transmission streams to the time domain. The output of each IDFT module 112 comprises a sequence of modulated OFDM symbols.
- A bank of $N_{TX}$ windowing modules 116 add a Guard Interval (GI) following each OFDM symbol, and then apply a window filter to the signal.

In the present example, RF circuitry 36 of AP 24 comprises a bank of $N_{TX}$ analog & RF modules 120. Each module 120 is configured to convert a respective transmission stream into an analog RF signal, for transmission by a respective antenna 40.

In various embodiments, pilot booster 68 in BB processor 32 is configured to apply boosting to at least some pilot sub-carriers at various suitable stages of the above-described transmission chain. In one example embodiment, pilot booster 68 applies boosting after spatial mapping (following spatial mapping module 108 and before IDFT modules 112). In another example embodiment, pilot booster 68 applies boosting immediately before spatial mapping (immediately before spatial mapping module 108). Generally, however, any stage of the transmission chain prior to IDFT modules 112 is suitable for applying boosting to pilot sub-carriers.

The example transmission chain depicted in FIG. 2 generally conforms (with the exception of pilot boosting) to IEEE 802.11ac. This choice, however, is made solely for the sake of clarity. The disclosed pilot boosting techniques can be applied with any other suitable transmission chain.

Figure 3:
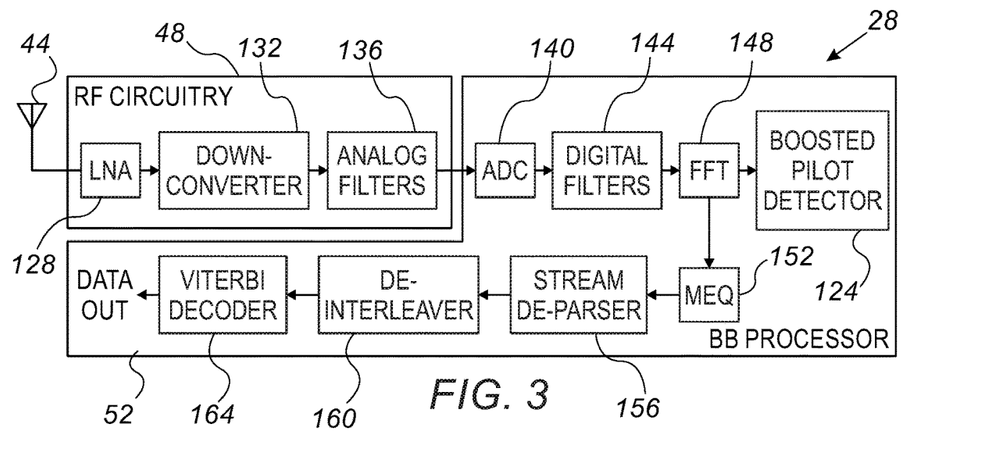
FIG. 3 is a block diagram that schematically illustrates a client station (STA) in the system of FIG. 1, which uses boosting of pilot sub-carriers, in accordance with an embodiment that is described herein.

FIG. 3 is a block diagram that schematically illustrates elements of STA 28 of system 20, in accordance with an embodiment that is described herein. The figure focuses on the receive-side elements of RF circuitry 48 and BB processor 52. Other STA elements, e.g., transmit-side elements, have been omitted for the sake of clarity. Furthermore, for added clarity, the figure illustrates the processing applied to a single stream (transmission stream, space-time stream, spatial stream or data stream, as appropriate).

Among other elements, BB processor of STA comprises a boosted-pilot detector 124, which is configured to detect whether at least some of the pilot sub-carriers in a received OFDM signal are power-boosted. As will be explained below, in some embodiments BB processor 52 processes the OFDM signal differently, depending on whether pilot boosting (of all pilots or of selected pilots) is detected or not.

In the embodiment of FIG. 3, RF circuitry 48 comprises a Low-Noise Amplifier (LNA) 128 that receives and amplifies the OFDM RF signal transmitted by AP 24. A downconverter 132 down-converts the RF signal to baseband. Analog filters 136 filter the baseband signal prior to digitization. The filtered analog baseband signal is provided to BB processor 52.

In BB processor 52, an Analog-to-Digital Converter (ADC) 140 digitizes the baseband signal. Digital filters 144 filter the digitized signal. A Fast Fourier Transform (FFT) module 148 applies FFT to the digital OFDM signal. A Matrix Equalizer (MEQ) applies adaptive equalization to the signal. A stream de-parser combines the different streams, and a de-interleaver 160 de-interleaves the streams. A Viterbi decoder 164 decodes the BCC. The decoded data is provided as output.

In an embodiment, boosted-pilot detector 124 receives the digital OFDM signal from the output of FFT module 148. Typically, the output of FFT module 148 (and thus the input of detector 124) comprises vectors of size N, wherein N denotes the number of sub-carriers. In a given vector, the square of the absolute magnitude of the $k^{th}$ element is indicative of the power level of the $k^{th}$ sub-carrier. By processing these vectors, boosted-pilot detector 124 detects which (if any) of the pilot sub-carriers is boosted in power relative to the non-pilot sub-carriers in the OFDM signal.

In some embodiments, detector 124 detects pilot boosting by processing selected OFDM symbols in the received signal, e.g., symbols of training fields. These symbols are also referred to as channel estimation symbols, since they are typically used by the receiver for channel estimation. Depending on the received packet format, suitable training fields may comprise, for example, a Legacy Long training Field (L-LTF), a High Throughput LTF (HTLTF), a Very High Throughput LTF (VHTLTF), a High Efficiency Wireless LTF (HEWLTF), or any other suitable training field.

In an embodiment, after selecting an OFDM symbol (a vector output by FFT module 148) to process, detector 124 computes the average power per non-pilot sub-carrier, denoted $P_{non-pilot}$:

$$P_{non-pilot} = \frac{1}{N_{non-pilot}} \sum_{k \in non-pilot} |y_k|^2 \qquad \text{Equation 1}$$

wherein $N_{non-pilot}$ denotes the number of non-pilot sub-carriers in the OFDM symbol, and $y_k$ denotes the (complex) value of the $k^{th}$ element of the vector output by FFT module 148.

In some embodiments, detector 124 classifies individual pilot sub-carriers as "boosted" or "not boosted" independently of other pilot sub-carriers. In an example embodiment, detector 124 selects a pilot sub-carrier whose index is k0 (i.e., whose complex value is provided in the k0$^{th}$ element of the FFT vector). Detector 124 checks whether the power level of this pilot subcarrier (denoted $P_{K0}=|y_{k0}|^2$) differs from the average power per non-pilot sub-carrier ($P_{non-pilot}$) by more than a used programmable threshold TH1. In this embodiment, if $P_{k0}/P_{non-pilot}>TH1$, detector 124 classifies the pilot sub-carrier as boosted. If $P_{k0}/P_{non-pilot}\leq TH1$, detector 124 classifies the pilot sub-carrier as non-boosted.

In alternative embodiments, detector 124 classifies a group of pilot sub-carriers collectively as "boosted" or "not boosted." In an example embodiment, detector 124 computes the average power per sub-carrier in the selected group, denoted $P_{pilots}$:

$$P_{pilots} = \frac{1}{N_p} \sum_{k \in pilotgroup} |y_k|^2 \qquad \text{Equation 2}$$

wherein $N_p$ denotes the number of sub-carriers in the selected group of pilot sub-carriers.

Detector 124 then checks whether the average power per sub-carrier in the group ($P_{pilots}$) differs from the average power per non-pilot sub-carrier ($P_{non-pilot}$) by more than a used programmable threshold TH2. In this embodiment, if $P_{pilots}/P_{non-pilot}>TH2$, detector 124 classifies the pilot sub-carrier group as boosted. If $P_{pilots}/P_{non-pilot}\leq TH2$, detector 124 classifies the pilot sub-carrier group as non-boosted.

In some embodiments, BB processor 52 of STA 28 processes the received OFDM signal differently, depending on whether pilot boosting is detected or not by detector 124. In an example embodiment, BB processor 52 performs frequency-domain smoothing over the sub-carriers of the received OFDM signal, e.g., by filtering the output of FFT module 148 with a suitable low-pass filter. If detector 124 decides that no pilot boosting is performed, BB processor 52 performs smoothing using all the sub-carriers in the received OFDM signal. If detector 124 finds that one or more pilot sub-carriers are boosted in power, BB processor 52 excludes the boosted pilot sub-carriers from the smoothing operation.

Alternatively, the processing performed by BB processor 52 may be adapted in any other suitable way, depending on whether pilot boosting is detected or not by detector 124. Further alternatively, as noted above, in some embodiments detector 124 is omitted altogether and BB processor 52 operates conventionally, notwithstanding the fact that some pilot sub-carriers may be boosted.

The configurations of system 20, AP 24 and STA 28 and their components, as shown in FIGS. 1-3, are depicted solely by way of example. In alternative embodiments, any other suitable configurations can be used. The various elements of AP 24 and STAs 28 may be implemented using dedicated hardware or firmware, such as hard-wired or programmable components, e.g., in one or more Application-Specific Integrated Circuits (ASICs), Field-Programmable Gate Arrays (FPGAs) or RF Integrated Circuits (RFICs), using software, or using a combination of hardware and software elements.

In some embodiments, certain elements of AP 24 and/or STAs 28, e.g., certain functions of BB processor 32 and/or BB processor 52, are implemented in one or more programmable processors, which are programmed in software to carry out the functions described herein. The software may be downloaded to the one or more processors in electronic form, over a network, for example, or it may, alternatively or additionally, be provided and/or stored on non-transitory tangible media, such as magnetic, optical, or electronic memory.

Figure 4:
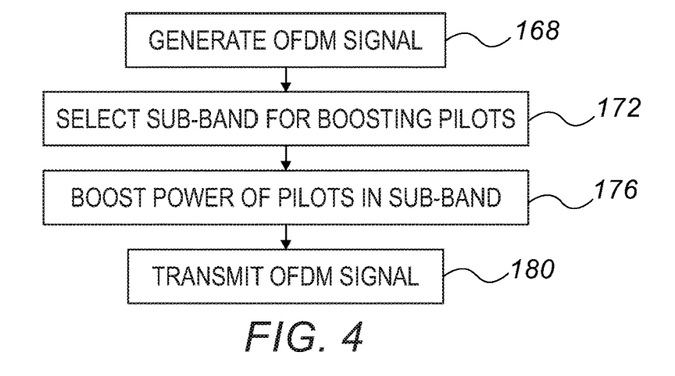
FIG. 4 is a flow chart that schematically illustrates a method for generating and transmitting an OFDM signal with boosted pilot sub-carriers, in accordance with an embodiment that is described herein.

FIG. 4 is a flow chart that schematically illustrates a method for generating and transmitting an OFDM signal with boosted pilot sub-carriers, in accordance with an embodiment that is described herein. In an embodiment, the method of FIG. 4 is carried out by AP 24 of system 20.

The method of FIG. 4 begins with BB processor 32 of AP 24 generating an OFDM signal, at a signal generation operation 168. At a sub-band selection operation 172, BB processor 32 selects a sub-band of the OFDM signal in which the pilot sub-carriers are to be boosted. At a boosting operation 176, BB processor 32 sets the power levels of the pilot sub-carriers in the selected sub-band to be higher than the power levels of the other sub-carriers in the OFDM signal. At a transmission operation 180, RF circuitry 36 of AP 24 transmits the signal to STA 28.

Figure 5:
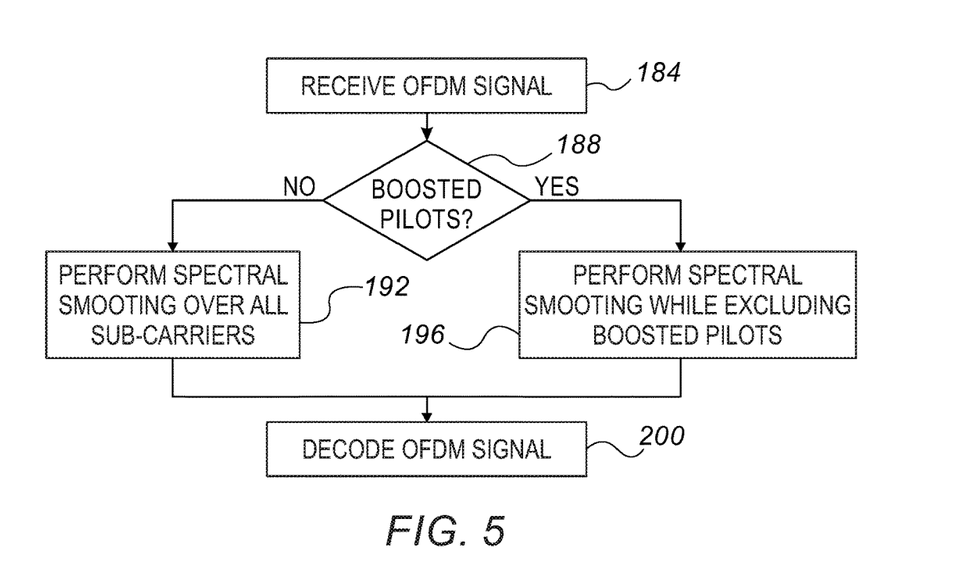
FIG. 5 is a flow chart that schematically illustrates a method for receiving and decoding an OFDM signal with boosted pilot sub-carriers, in accordance with an embodiment that is described herein.

FIG. 5 is a flow chart that schematically illustrates a method for receiving and decoding an OFDM signal with boosted pilot sub-carriers, in accordance with an embodiment that is described herein. In an embodiment, the method of FIG. 5 is carried out by STA 28 of system 20.

The method of FIG. 5 begins with RF circuitry 48 of STA 28 receiving an OFDM signal, at a reception operation 184. At a boost checking operation 188, BB processor 52 of STA 28 checks whether pilot boosting was performed in the received OFDM signal. Any of the techniques described above with respect to boosted-pilot detector 124 can be used for this purpose. If boosting is not detected, BB processor 52 performs smoothing using all the sub-carriers in the received OFDM signal, at a smoothing operation 192. If boosting is detected, BB processor 52 performs smoothing while excluding the boosted pilot sub-carriers, at a selective smoothing operation 196. BB processor 52 decodes the OFDM signal, at a decoding operation 200, so as to extract the data carried by the signal.

In some embodiments, AP 24 transmits to STA 28 WLAN packets, e.g., packets formatted in accordance with one of the IEEE 802.11 standards. Each packet comprises a sequence of OFDM symbols. AP 24 performs pilot boosting in at least some of the OFDM symbols in the packet, but not necessarily in all of the symbols. Applying pilot boosting only in a selected portion is useful because, as explained above, boosting of pilot sub-carriers leaves less available power for non-pilot sub-carriers. In an example embodiment, AP 24 boosts pilot sub-carriers in an initial portion of the packet, in order to provide the STA receiver with better conditions for synchronization at the at the beginning of the packet.

Figure 6:
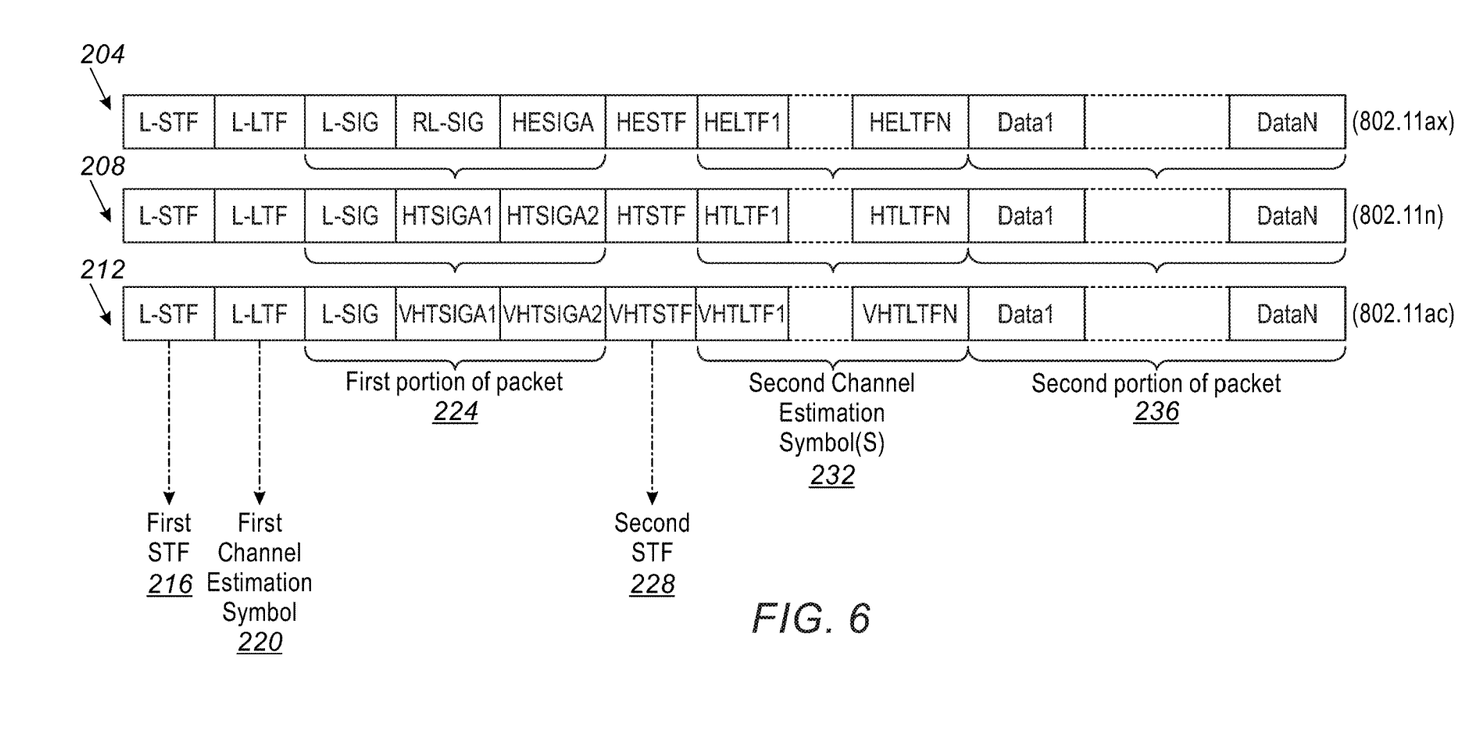
FIG. 6 is a diagram that schematically illustrates example packet formats in which pilot sub-carriers are boosted, in accordance with embodiments that are described herein.

FIG. 6 is a diagram that schematically illustrates example packet formats in which pilot sub-carriers are boosted, in accordance with embodiments that are described herein. A packet 204 complies with the IEEE 802.11ax standard, a packet 208 complies with the IEEE 802.11n standard, and a packet 212 complies with the IEEE 802.11ac standard.

Packets 204, 208 and 212 are similar to one another in their general structure, and the differences between them are mainly in the specific types of training fields (channel estimation fields) being used. The general packet structure begins with a first Short Training Field (STF) 216 comprising a Legacy STF (L-STF), followed by a first channel estimation symbol 220 comprising a Legacy Long Training Field (L-LTF), and then followed by a first packet portion 224 comprising SIG fields that comprise information relating to subsequent elements of the packet. The first packet portion is followed by a second STF 228, followed by one or more second channel estimation symbols 232 comprising suitable LTFs, and finally a second packet portion 236 comprising data symbols.

As seen in the figure, the first channel estimation field 220 is followed by the first packet portion 224, and the second channel estimation field 232 is followed by the second packet portion 236. In accordance with the IEEE 802.11 standards, each packet portion has the same pattern of pilot sub-carriers (e.g., the same set of sub-carrier frequencies) as the preceding channel estimation field. It is permitted, however, that the first channel estimation field and the first packet portion have one pilot sub-carrier pattern, and the second channel estimation field and the second packet portion have a different pilot sub-carrier pattern.

In order to ensure proper receiver operation, BB processor 32 typically sets the pilot sub-carriers in the channel estimation field and in the following packet portion to have the same power level. In other words, when power-boosting the pilot sub-carriers of a certain packet portion, BB processor 32 boosts the pilot sub-carriers in the preceding channel estimation field (training field) by the same amount.

In the example packets shown in FIG. 6, BB processor 32 has several options of performing pilot boosting:
  Boost the power of pilot sub-carriers in first channel estimation symbol 220 and in first packet portion 224 (but not in second channel estimation symbol(s) 232 and in second packet portion 236).
  Boost the power of pilot sub-carriers in second channel estimation symbol(s) 232 and in second packet portion 236 (but not in first channel estimation symbol 220 and in first packet portion 224).
  Boost the power of pilot sub-carriers in both (i) first channel estimation symbol 220 and first packet portion 224, and (ii) second channel estimation symbol(s) 232 and second packet portion 236.

In some embodiments, BB processor 32 performs both physical (PHY) layer processing and Medium Access Control (MAC) layer processing. In an embodiment, the entire pilot boosting functionality described herein is carried out in the PHY layer of BB processor 32. In an embodiment, the PHY layer receives from the MAC layer parameters for configuring the pilot boosting operation. Example parameters comprise portion(s) of the packet and/or frequency sub-bands in which boosting is to be performed.

As noted above, in some embodiments boosted-pilot detector 124 in BB processor 52 of STA 28 detects whether at least some of the pilot sub-carriers in a received OFDM signal are power-boosted. In some embodiments, when a received packet comprises multiple channel estimation symbols (training fields) such as HELTF, HTLTF and/or VHTLTF symbols, detector 124 may check for pilot boosting in only one of the channel estimation symbols in the packet, in a selected subset of the channel estimation symbols in the packet, or in all the channel estimation symbols in the packet. In any of these embodiments, detector 124 may classify individual pilot sub-carriers as boosted or non-boosted, or classify groups of pilot sub-carriers as boosted or non-boosted.

In these embodiments, detector 124 typically computes $P_{non-pilot}$ by averaging the power level of the FFT vector elements (output of FFT module 148) corresponding to non-pilot sub-carriers, across all the channel estimation symbols in the packet. When classifying an individual pilot sub-carrier k0, detector 124 typically computes $P_{k0}$ by averaging the power level of the $k0^{th}$ FFT vector element over some or all channel estimation symbols in the packet. When classifying a group of pilot sub-carriers k∈pilotgroup, detector 124 typically computes $P_{pilots}$ by averaging the power levels of the $k^{th}$ FFT vector elements, k∈pilotgroup, over some or all channel estimation symbols in the packet.

In some example embodiments, BB processor 32 of AP 24 decides whether or not to perform pilot boosting, depending on the vendor identifier (ID) of STA 28. This feature enables AP 24 to perform pilot boosting when transmitting to STAs of one vendor, but not when transmitting to STAs of another vendor. In one example, pilot boosting is enabled only for vendors whose STAs are known to support receiver-side identification of pilot boosting. The vendor ID is typically reported by STA 28 as part of the initial association with AP 24 and then retained in the AP memory. In an embodiment, the PHY layer in BB processor 32 receives the vendor ID from the MAC layer, and configures pilot boosting accordingly.

Although the embodiments described herein mainly address OFDM systems, the methods and systems described herein can also be used in other applications, such as in Orthogonal Frequency Division Multiple Access (OFDMA) systems, as well as with other modulation schemes in which each symbol comprises multiple sub-carriers.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:
1. A method for signal transmission, comprising:
  generating a sequence of modulated symbols, each modulated symbol comprising multiple sub-carriers having respective sub-carrier frequencies, by:
    designating a first subset of the sub-carriers to serve as non-pilot sub-carriers, and designating a second subset of the sub-carriers to serve as pilot sub-carriers;
    modulating non-pilot information onto the non-pilot sub-carriers, and modulating pilot information onto the pilot sub-carriers; and
    in at least some of the symbols, setting the non-pilot sub-carriers to a first power level, setting a partial subset of the pilot sub-carriers that is less than all the sub-carriers to a second power level, and retaining one or more pilot sub-carriers which are not in the partial subset at the first power level, the second power level being higher than the first power level, wherein the partial subset of the pilot sub-carriers set to the second power level is selected to maintain an average power level for a respective symbol; and
  transmitting the sequence of the modulated symbols over a communication channel to a receiver.

2. The method according to claim 1, wherein generating the modulated symbols comprises generating Orthogonal Frequency Division Multiplexing (OFDM) symbols.

3. The method according to claim 1, wherein generating the sequence comprises generating a communication packet comprising at least a training-field symbol followed by data symbols, and wherein setting the second power level comprises setting the pilot symbols in the training-field symbol and in the following data symbols to a same second power level.

4. The method according to claim 1, wherein generating the sequence comprises generating a communication packet, and comprising:
  setting the second power level, applied to the pilot sub-carriers, to be higher than the first power level in a first portion of the communication packet; and
  in a second portion of the communication packet, setting the second power level to be equal to the first power level.

5. The method according to claim 1, wherein the receiver is associated with a vendor identifier, and comprising deciding whether or not to set the second power level to be higher than the first power level, depending on the vendor identifier of the receiver, wherein the vendor identifier is received by a physical (PHY) layer, from a Medium Access Control (MAC) layer.

6. The method according to claim 1, further comprising selecting the partial subset of the pilot sub-carriers, in which the second power level is to be higher than the first power level, depending on received-signal quality on the respective sub-carrier frequencies.

7. The method of claim 1, wherein the receiver which receives the sequence of the modulated symbols excludes the one or more of the pilot sub-carriers set to the second power level that is higher than the first power level from a spectral smoothing prior to decoding the sequence of the modulated symbols.

8. The method of claim 1, wherein pilot subcarriers of a first packet portion of the sequence of modulated symbols and a first channel estimation field of the sequence of modulated symbols that precedes the first packet portion have a different power level than pilot subcarriers of a second packet portion of the sequence of modulated symbols and a second channel estimation field of the sequence of modulated symbols that precedes the second packet portion.

9. A method for signal transmission, comprising:
  generating a sequence of modulated symbols, each modulated symbol comprising multiple sub-carriers having respective sub-carrier frequencies, by:
    designating a first subset of the sub-carriers to serve as non-pilot sub-carriers, and designating a second subset of the sub-carriers to serve as pilot sub-carriers;
    modulating non-pilot information onto the non-pilot sub-carriers, and modulating pilot information onto the pilot sub-carriers; and
    in at least some of the symbols, setting the non-pilot sub-carriers to a first power level, and setting one or more of the pilot sub-carriers to a second power level that is higher than the first power level; and
  transmitting the sequence of the modulated symbols over a communication channel to a receiver, wherein generating the modulated symbols is performed in a physical-layer (PHY) process, and comprising receiving in the PHY process, from a Medium Access Control (MAC) process, one or more parameters for configuring the pilot sub-carriers, and setting the one or more of the pilot sub-carriers to the second power level based on the one or more parameters.

10. The method according to claim 9, wherein the one or more parameters comprise an indication of a portion of the communication packet in which the one or more of the pilot sub-carriers are to be set to the second power level.

11. The method according to claim 9, wherein the one or more parameters comprise an indication of a frequency sub-band in which the one or more of the pilot sub-carriers are to be set to the second power level.

12. The method according to claim 9, wherein the one or more parameters comprise a vendor identifier that the receiver is associated with.

13. A transmitter, comprising:
  a baseband processor configured to generate a sequence of modulated symbols, each modulated symbol comprising multiple sub-carriers having respective sub-carrier frequencies, by:
    designating a first subset of the sub-carriers that is less than all of the sub-carriers to serve as non-pilot sub-carriers, and designating a second subset of the sub-carriers that is different from the first set of sub-carriers to serve as pilot sub-carriers;
    modulating non-pilot information onto the non-pilot sub-carriers, and modulating pilot information onto the pilot sub-carriers; and
    in at least some of the symbols, setting the non-pilot sub-carriers to a first power level, and setting a partial subset of the pilot sub-carriers that is less than all the sub-carriers to a second power level, and retaining one or more pilot sub-carriers which are not in the partial subset at the first power level, the second power level being higher than the first power level, wherein the partial subset of the pilot sub-carriers set to the second power level is selected to maintain an average power level for a respective symbol; and
  Radio Frequency (RF) circuitry configured to transmit the sequence of the modulated symbols over a communication channel to a receiver.

14. The transmitter according to claim 13, wherein the baseband processor is configured to generate the modulated symbols by generating Orthogonal Frequency Division Multiplexing (OFDM) symbols.

15. The transmitter according to claim 13, wherein the baseband processor is configured to generate a communication packet comprising at least a training-field symbol followed by data symbols, and to set the pilot symbols in the training-field symbol and in the following data symbols to a same second power level.

16. The transmitter according to claim 13, wherein the baseband processor is configured to:
  generate a communication packet;
  set the second power level, applied to the pilot sub-carriers, to be higher than the first power level in a first portion of the communication packet; and
  in a second portion of the communication packet, set the second power level to be equal to the first power level.

17. The transmitter according to claim 13, wherein the receiver is associated with a vendor identifier, and wherein the baseband processor is configured to decide whether or not to set the second power level to be higher than the first power level, depending on the vendor identifier of the receiver, wherein the vendor identifier is received in a physical (PHY) layer, from a Medium Access Control (MAC) layer.

18. The transmitter according to claim 13, wherein the baseband processor is configured to select the partial subset of the pilot sub-carriers, in which the second power level is to be higher than the first power level, depending on received-signal quality on the respective sub-carrier frequencies.

19. The transmitter of claim 13, wherein the receiver which receives the sequence of the modulated symbols excludes the one or more of the pilot sub-carriers set to the second power level that is higher than the first power level from a spectral smoothing prior to decoding the sequence of the modulated symbols.

20. The transmitter of claim 13, wherein pilot subcarriers of a first packet portion of the sequence of modulated symbols and a first channel estimation field of the sequence of modulated symbols that precedes the first packet portion have a different power level than pilot subcarriers of a second packet portion of the sequence of modulated symbols and a second channel estimation field of the sequence of modulated symbols that precedes the second packet portion.

21. A transmitter, comprising:
a baseband processor configured to generate a sequence of modulated symbols, each modulated symbol comprising multiple sub-carriers having respective sub-carrier frequencies, by:
designating a first subset of the sub-carriers that is less than all of the sub-carriers to serve as non-pilot sub-carriers, and designating a second subset of the sub-carriers that is different from the first set of sub-carriers to serve as pilot sub-carriers;
modulating non-pilot information onto the non-pilot sub-carriers, and modulating pilot information onto the pilot sub-carriers; and
in at least some of the symbols, setting the non-pilot sub-carriers to a first power level, and setting one or more of the pilot sub-carriers to a second power level that is higher than the first power level; and
Radio Frequency (RF) circuitry configured to transmit the sequence of the modulated symbols over a communication channel to a receiver, wherein the baseband processor is configured to generate the modulated symbols in a physical-layer (PHY) process, to receive in the PHY process, from a Medium Access Control (MAC) process, one or more parameters for configuring the pilot sub-carriers, and to set the one or more of the pilot sub-carriers to the second power level based on the one or more parameters.

22. The transmitter according to claim 21, wherein the one or more parameters comprise an indication of a portion of the communication packet in which the one or more of the pilot sub-carriers are to be set to the second power level.

* * * * *